US011997992B1

(12) United States Patent
Olsen et al.

(10) Patent No.: US 11,997,992 B1
(45) Date of Patent: Jun. 4, 2024

(54) LOBSTER TETHER AND METHOD OF TETHERING A LOBSTER (71) Applicant: LOBSTER LIFE SYSTEMS, INC., Lodi, NJ (US)

(72) Inventors: Thomas M. Olsen, Tallman, NY (US); David D. McClanahan, Harleysville, PA (US)

(*) Notice: Subject to any disclaimer, the term of this patent is extended or adjusted under 35 U.S.C. 154(b) by 414 days.

(21) Appl. No.: 17/506,369

(22) Filed: Oct. 20, 2021

Related U.S. Application Data (60) Provisional application No. 63/093,887, filed on Oct. 20, 2020.

(51) Int. Cl.
A01K 61/59 (2017.01)
A01K 15/00 (2006.01)

(52) U.S. Cl.
CPC ............ A01K 61/59 (2017.01); A01K 15/003 (2013.01)

(58) Field of Classification Search
CPC ...... A01K 61/59; A01K 15/003; A01M 23/34
See application file for complete search history.

(56) References Cited

U.S. PATENT DOCUMENTS

| | | | |
|---|---|---|---|
| 1,997,711 A | 4/1935 | Barwood | |
| 2,499,511 A * | 3/1950 | Koger | A01K 15/003 119/803 |
| 2,704,052 A * | 3/1955 | Wood | A01K 15/003 43/87 |
| 3,022,557 A | 2/1962 | Logan | |
| 3,540,769 A * | 11/1970 | Rosser | A01M 23/34 294/119.2 |
| 4,083,142 A * | 4/1978 | Gregerson | A01M 23/34 43/87 |
| 4,179,837 A * | 12/1979 | Gummeringer | A01M 23/34 43/87 |
| 4,599,074 A * | 7/1986 | Beckly | B63C 9/26 114/221 R |
| 5,129,363 A * | 7/1992 | Ricketts | A01K 27/004 119/799 |
| 5,538,302 A * | 7/1996 | Travis | B63B 21/54 294/24 |
| 5,548,876 A * | 8/1996 | Oetiker | F16L 33/12 24/271 |
| 5,632,405 A | 5/1997 | McMath | |
| 5,752,731 A * | 5/1998 | Crone | A62B 99/00 294/24 |
| 5,755,222 A | 5/1998 | Pansard et al. | |
| 5,832,651 A * | 11/1998 | Arntz | A01K 97/14 294/19.3 |

(Continued)

Primary Examiner — Monica L Perry
Assistant Examiner — Edgar Reyes (57) ABSTRACT A lobster tether has a strap configured for coupling a lobster to a handle configured on a handle extension that enables easier retrieval of a lobster from a tank. The handle extension is rigid and free-standing thereby placing the handle proximal to or above the water level in a tank. A lobster tether may be made out of a material that floats, such a plastic and may be a material that is food safe and can withstand cooking temperatures, such as boiling water. In addition, a lobster tether may be a monolithic part, made from a single piece of material, such as by injection molding. The strap has teeth that engage with latch teeth to secure the strap around a lobster or other shellfish.

21 Claims, 8 Drawing Sheets (56) References Cited

U.S. PATENT DOCUMENTS

| | | | | |
|---|---|---|---|---|
| 5,979,106 | A | * | 11/1999 | Butler .................. A01M 23/34 43/87 |
| 6,079,141 | A | * | 6/2000 | Washecka ............. A01M 23/34 114/221 R |
| 7,185,399 | B2 | | 3/2007 | Logan |
| 7,252,583 | B1 | * | 8/2007 | Jones ...................... A22B 5/06 452/102 |
| 8,887,434 | B2 | * | 11/2014 | Waugh .................. A01K 97/20 43/6 |
| 9,220,246 | B1 | | 12/2015 | Roman |
| 2009/0293234 | A1 | | 12/2009 | Chang et al. |
| 2010/0146838 | A1 | * | 6/2010 | Contreras ............. A01K 97/00 43/87 |
| 2019/0045762 | A1 | * | 2/2019 | Luty ..................... A01K 74/00 |
| 2022/0264867 | A1 | * | 8/2022 | Shaw .................... A01M 23/24 |
| 2022/0408694 | A1 | * | 12/2022 | Brice .................. A01K 15/003 |

* cited by examiner

FIG. 14

LOBSTER TETHER AND METHOD OF TETHERING A LOBSTER

CROSS REFERENCE TO RELATED APPLICATIONS

This application claims the benefit of priority to U.S. provisional patent application No. 63/093,887, filed on Oct. 20, 2020, the entirety of which is hereby incorporated by reference herein.

BACKGROUND OF THE INVENTION

Field of the Invention

The invention relates to lobster tether having a strap configured to retain a lobster and a handle extension extending up to a handle to enable the lobster to be removed from a water tank by said handle.

Background

Lobsters and shellfish are often kept in tanks to keep them alive until they are sold or prepared for a customer. A person may select a lobster and then the lobster has to be retrieved. This can be difficult when the tank is deep or when there are a lot of lobsters in the tank, thereby making hard to sort through them.

SUMMARY OF THE INVENTION

The invention is directed to lobster tether that has a strap configured for detachably coupling a lobster to a handle on a handle extension that enables easier retrieval of a lobster from a tank. The handle extension is rigid and free-standing thereby placing the handle proximal to or above the water level in a tank. An exemplary lobster tether may be made out of a material that floats, such a plastic. The lobster tether may be made out of a material that food safe and temperature resistant to withstand cooking temperatures, such as boiling water or about 100° C., or about 120° C. or more. In addition, a lobster tether may be a monolithic part, made from a single piece of material, such as by injection molding.

An exemplary handle extension extends up from the latch to enable retrieving a lobster, retained by the strap configured around the lobster's body, from a water tank, for example. The handle extension has a length from the latch end to the handle end and this length may be about 100 mm or more, about 150 mm or more, about 200 mm or more, about 250 mm, about 300 or more and any range between and including the lengths provided. The handle extension length may be effectively long to enable easy retrieval of the lobster from a tank of water. Also, the handle extension may be free standing, whereby the handle is effectively rigid and stiff to extend vertically upward without any additional support and without the handle extension bending under the weight of the handle configured on the handle end of the handle extension. The handle extension may have a cross-length cross-sectional shape that increases rigidity, such a polygonal shaped, including rectangular in shape, or may have stiffening extensions or ribs.

The handle has a top that may extend out of the water of a tank for retaining lobsters therein. The handle may have a grip portion that extends outward from the length axis of the handle extension, such as extending out orthogonally. In an exemplary embodiment, the handle is a T-handle having two grip portions that extend outward in opposing directions from the handle extension, and again may extend out orthogonally from the handle extension. A handle may have a width that is much greater than the width of the handle extension, such as at least 5 times greater or at least 10 times great or even 20 times greater than the width of the handle extension. The handle may also have grip undulations on a handle bottom to engage with a person's fingers. The top of the handle may be curved for conforming with a person's hand as well. The handle may also have an identification portion, such as a planar portion for receiving an identification label, such as a weight label. The lobster may be retained by the lobster tether and then weighed to determine a lobster weight, such as 2.0 lbs, and this weight may by written or printed on the label and placed on the identification portion of the handle. A person may quickly and easily identify a lobster of a desired weight by viewing the weight label that may extend out from the tank. This may greatly improve efficiency in retrieving lobsters from the tank. An identification portion may also include a weight that is already printed or formed in the handle, such as being molded therein and a plurality of different weight lobster tethers may be provided.

An exemplary lobster tether has a strap that extends from a latch end, on the bottom of the latch, to an extended end that is configured for insertion into the latch channel through the latch inlet. The extended end may have a tapered insert end to better guide the strap into the latch inlet of the latch channel. The strap extends from an opposing side of the latch channel than the handle extension. The strap has strap teeth, which may be configured on an outside surface of the strap, opposite the inside surface, wherein the outside surface is the surface facing the handle extension as the strap extends through the latch channel, so that it engaged with the latch teeth. An exemplary strap may also have a body portion, a portion of the strap proximal to the latch that has no strap teeth on the outside surface, as this portion is configured to extend around the lobster's body or claw. The strap may have strap grip protrusions that extend from the inside surface to provide better engagement with the shellfish. These strap grip protrusions may be configured along a portion of the strap from the latch end and may not be configured proximal to the extended end as they may interfere with insertion of the strap through the latch channel.

The strap is configured to flex and bend away from the handle to form a strap loop below the latch and opposite the handle. The strap is configured to extend through the latch channel and out from the latch outlet where the strap teeth engage with the latch teeth on the latch-release. The latch-release may comprise a latch handle or extension can be actuated or pivoted away from the strap to disengage the latch teeth with the strap teeth. The latch-release may be pivoted upward toward the strap side of the handle extension. An exemplary strap has a length from a latch end to an extended end which may be about 100 mm or more, about 150 mm or more, about 200 mm or more, about 250 mm or more and any range between and including the lengths provided.

The lobster tether may have a latch-release stop, such as a tab extending over the latch-release that is configured to prevent the latch-release from pivoting excessively upward, as this may compromise the living hinge type latch pivot. A living hinge is a material that flexes to allow rotation or pivoting. The latch hinge may be a flexible extension of the latch-release between the latch-release and the latch or handle extension. A latch hinge may have a smaller cross-sectional area than the latch-release to enable the latch-release to pivot about the latch hinge. Put another way, the latch-release may taper to the latch hinge.

An exemplary latch is configured to releasably engage with the strap to retain the strap in a secure position around a lobster. The latch is configured on the latch end of the handle extension. An exemplary latch has a latch channel extending from the latch inlet to the latch outlet. The latch channel may have a strap guide surface on the top and bottom of the latch channel to form a latch channel that is curved, or extends along a radius, to enable the strap to slide through the channel more easily. The curve or radius of the latch channel may be in the same orientation as the curvature of the strap loop formed around a lobster. The latch teeth engage with the strap teeth to secure the strap in the latch. An exemplary latch-release is actuated, such as by being pivoted away from the strap teeth engaged with the latch teeth, to disengage the latch teeth from the strap teeth. The latch-release may be pivoted toward the handle extension, for example. The strap can then be pulled through the latch channel to release the strap and lobster retained thereby.

A latch engagement protrusion may be configured proximal to the latch end of the strap and be configured to press the strap against the latch-release. The latch engagement protrusion may prevent the strap from slipping through the channel and loosening the strap.

The handle may be configured to swivel or turn about the handle extension to enable the shellfish to move freely within a tank without the handles getting stuck on one another.

The length of the handle extension may be greater than the length of the strap, or substantially the same length wherein the length of the handle extension is at least 75% or more the length of the strap, or at least 85% or even 90% of the length of the strap.

This invention enables a method of tethering a lobster with the lobster tether described herein. The exemplary lobster tether may be used to tether by extending the strap around a portion of the lobster, such as around the body or claw for example, and inserting the extended end of the strap through the latch channel and pulling to tighten the strap around the lobster. The extended end may be pulled to tighten the strap around the lobster. The lobster tether may be used to carry the lobster to move the lobster onto a scale for weighing the lobster, for placing the lobster in a tank of water at a store or restaurant, and for retrieving the lobster from said tank. The handle may be used to move the lobster from place to place. The lobster tether may be used to place the lobster in a pot or cooking vessel for boiling the lobster as well, and then subsequently retrieving the lobster from the cooking vessel after being cooked. Finally, the lobster may be moved to a plate before the lobster tether is removed. The lobster tether may be removed between any of the steps as required or desired.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
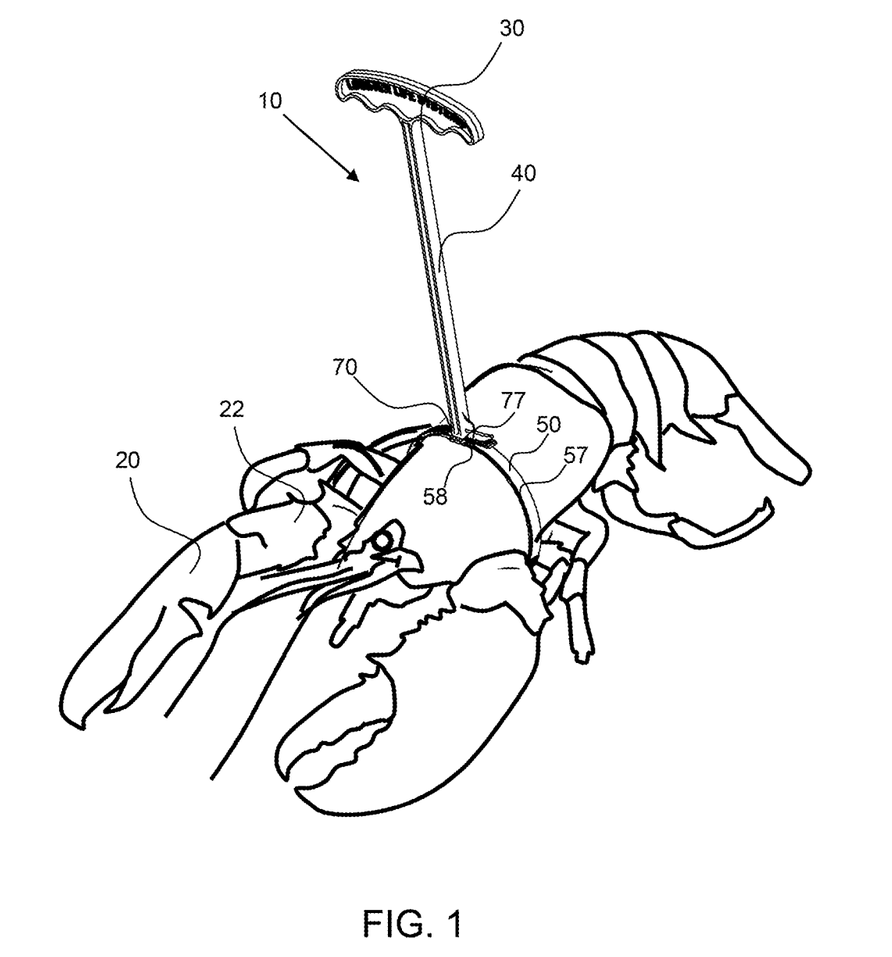
FIG. 1 shows a perspective view of a lobster having an exemplary lobster tether retained around the body of the lobster.

As shown in FIG. 1, an exemplary lobster tether 10 has a handle 30 configured on a handle end of a handle extension 40 and a latch 70 on a latch end of the handle extension. A strap 50 is configured to extend around a shellfish 20, such as a lobster 22, and through the latch 70. The handle extension extends up from the latch to enable retrieving a lobster, retained by the strap configured around the lobster's body, from a water tank, for example.

Referring to FIGS. 2, 3, 4 and 5, an exemplary lobster tether 10 has a handle extension 40 extending up from a latch 70 to a handle 30 and a strap 50 configured to extend around a shellfish, such as a lobster, and through the latch. The strap 50 extends from a strap side 46 of the handle extension 40, or latch, and extends into the latch on a latch insert side 48 of the handle extension, or latch. The handle extension 40 has a length 43 from the latch end 44 to the handle end 42. As described herein, the handle extension length may be effectively long to enable easy retrieval of the lobster from a tank of water and may be 150 mm or more. Also, the handle extension may be free standing, whereby the handle is effectively rigid and stiff to extend vertically upward without any additional support.

The handle 30 has a handle top 32 that may extend out of the water of a tank for retaining lobsters. The handle may have a grip portion 31 that extends outward from the length axis 45 of the handle extension, such as extending out orthogonally. The length axis of the handle extension extends along the length of the handle extension 40 from the latch end 44 to the handle end 42. Again, the handle extension may be effectively rigid, or free standing, to keep the handle extension extending upward without bending when the lobster tether is configured around a lobster. In an exemplary embodiment, the handle is a T-handle 33 having two grip portions 31, 31' that extend outward in opposing directions from the handle extension, and again may extend out orthogonally from the handle extension. The handle may have a curved handle top 32 for conforming with a person's hand for comfort. The handle may also have grip undulations 36 on a handle bottom 35 to engage with a person's fingers. The handle may also have an identification portion 34, such as a planar portion for receiving an identification label 38, such as a weight label. The weight label may be attached to the handle after retaining the lobster with the lobster tether 10 and weighing the lobster. The lobster can then be placed in the lobster tank and the weight may be visible through the glass to allow a person to select a lobster of a desired weight. The handle extension may be effectively long to extend the handle 30 out of the water for easy retrieval of a lobster. The identification portion may also be molded into or be formed as part of the handle. The handle 30 may be configured to swivel, or rotate about the handle extension 40, as indicated by the large curved arrow between FIGS. 4 and 5 to enable the shellfish to move freely within a tank without the handles getting stuck on one another. The width 37 of the handle 30, extending across the grip portions 31, 31', may be much greater than the width 47 of the handle extension 40, as described herein.

Figure 2:
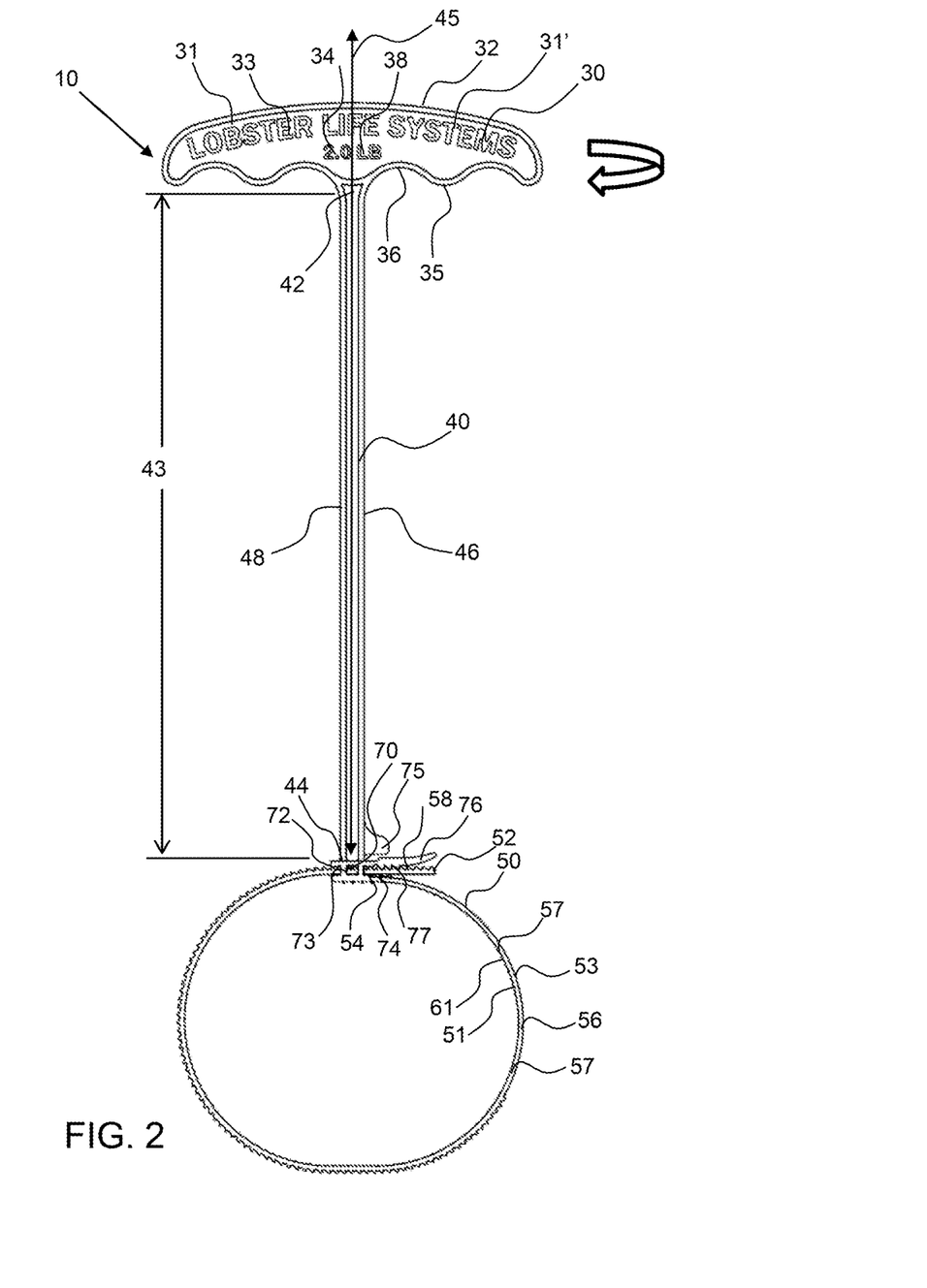
FIG. 2 shows a front view of an exemplary lobster tether having a handle extension extending up from a latch to a handle and a strap having the extended end inserted through the latch channel to form a strap loop.
Figure 3:
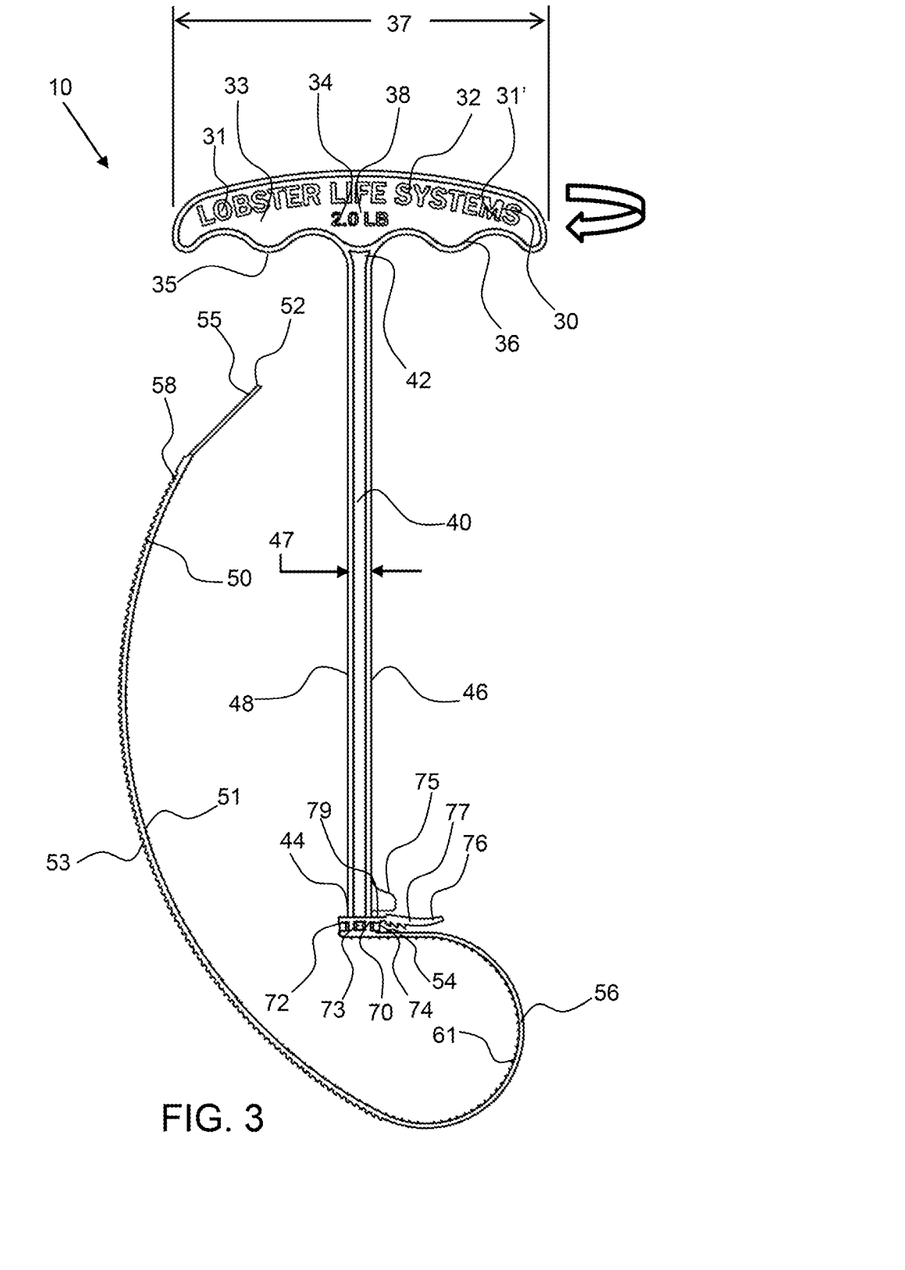
FIG. 3 shows a perspective view of the exemplary lobster tether shown in FIG. 2 with the strap free from the latch.
Figure 4:
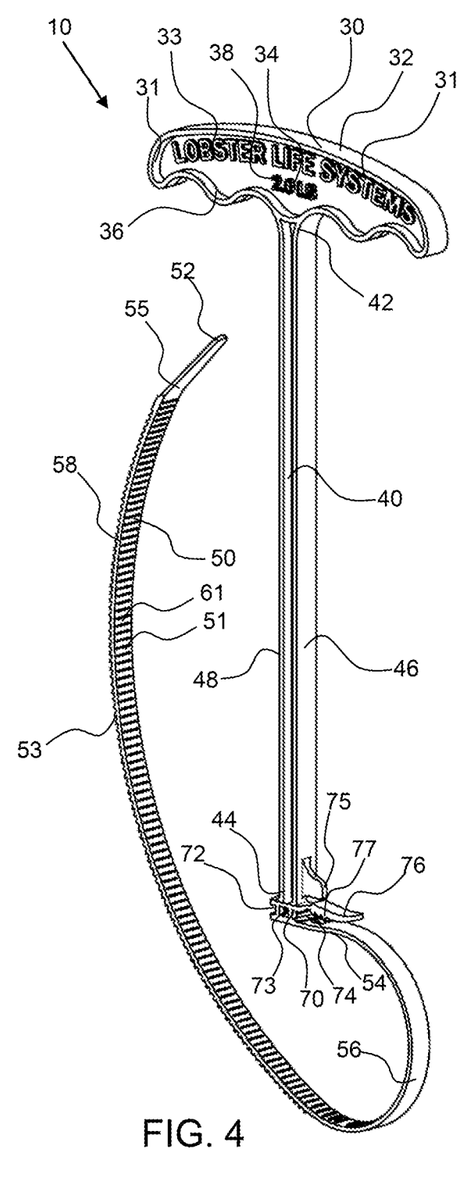
FIG. 4 shows a perspective view of the exemplary lobster tether shown in FIG. 3.
Figure 5:
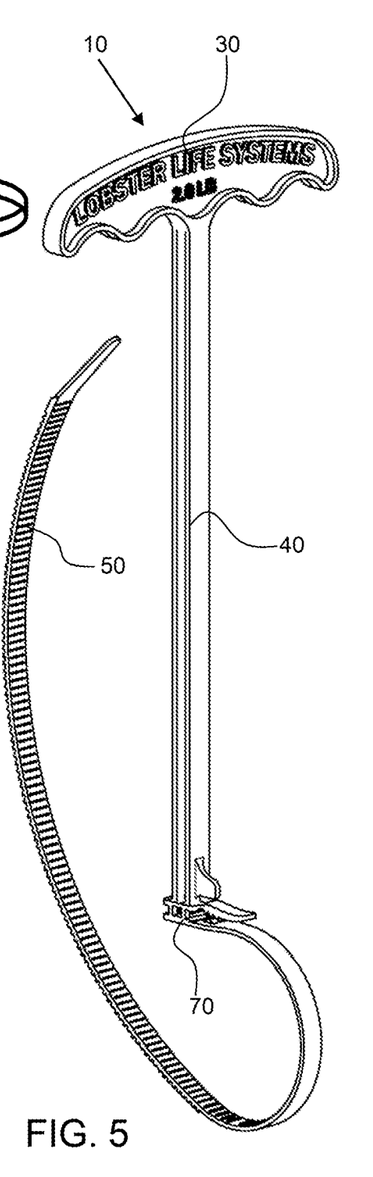
FIG. 5 shows a perspective view of the exemplary lobster tether shown in FIG. 4 with the handle turned.
Figure 6:
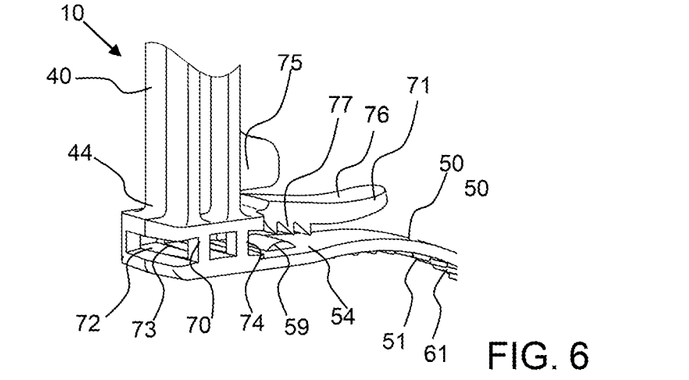
FIG. 6 shows a perspective view of the latch insert side of the latch and latch inlet configured for insertion of the extended end of the strap into the latch channel.
Figure 7:
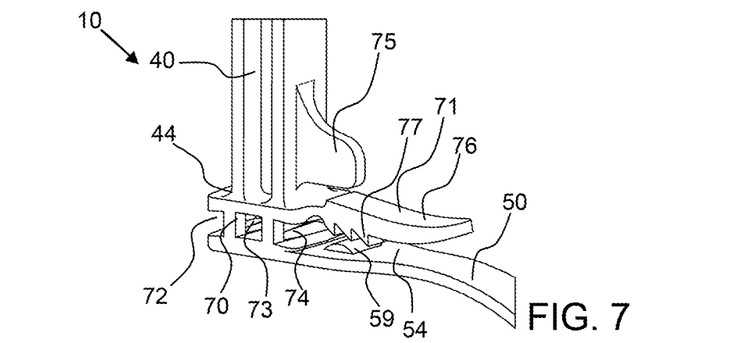
FIG. 7 shows a perspective view of the strap side of the latch having the strap extending from the bottom portion of the latch, a latch outlet and latch-release having latch teeth thereon for engagement with the strap teeth.

The strap 50 extends from the latch end 54, on the bottom of the latch 70, to an extended end 52 that is configured for insertion into the latch channel 73 through the latch inlet 72. The strap may have a tapered insert end 55 to enable easier insertion of the extended end 52 into the latch inlet 72. The strap has strap teeth 58 configured on an outside surface 53 of the strap, opposite the inside surface 51. The strap may also have a body portion 56, or a portion of the strap proximal to the latch that has no teeth on the outside surface, as this portion is configured to extend around the lobster's body or claw. The body portion may extend about 10% or more of the strap length, about 20% or more, about 30% or more or even about 50% or more of the strap length and any range between and including the percentages provided. The strap may have strap grip protrusions 61 extending out from the inside surface 51 to provide better engagement around the shellfish and to prevent the strap from spinning about the shellfish. The strap is configured to flex and bend away from the handle to form a strap loop 57 below the latch and opposite the handle, as shown in FIG. 2. The strap loop is a loop from the latch end of the strap to the strap configured in the latch. The strap is configured to extend through the latch channel and out from the latch outlet 74 where the strap teeth 58 engage with the latch teeth 77 on the latch-release 76, also shown in FIG. 2. The latch handle 71 of the latch-release can be actuated upward, or away from the strap to disengage the latch teeth with the strap teeth. A latch-release stop 75, such as a tab extending over the latch-release, is configured to prevent the latch-release from pivoting excessively, as this may compromise the living hinge type latch pivot.

Figure 8:
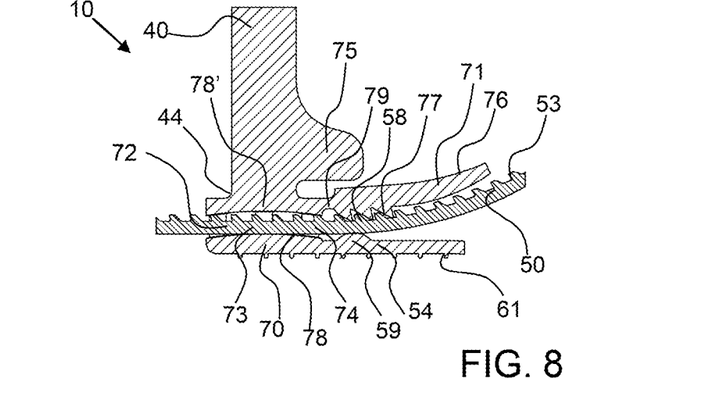
FIG. 8 shows a cross-sectional view of the exemplary latch having the strap extending through the latch channel and the latch teeth on the latch-release engaged with the strap teeth.
Figure 9:
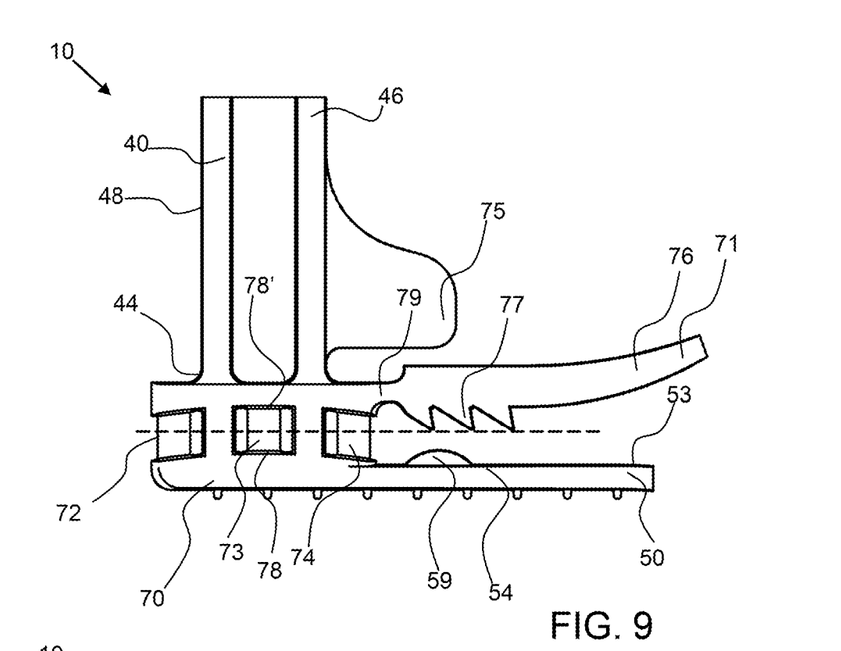
FIG. 9 shows a front view of the exemplary latch having a latch channel for receiving the strap therethrough and latch teeth on the latch-release that engage with the strap teeth to retain the strap in the latch.
Figure 10:
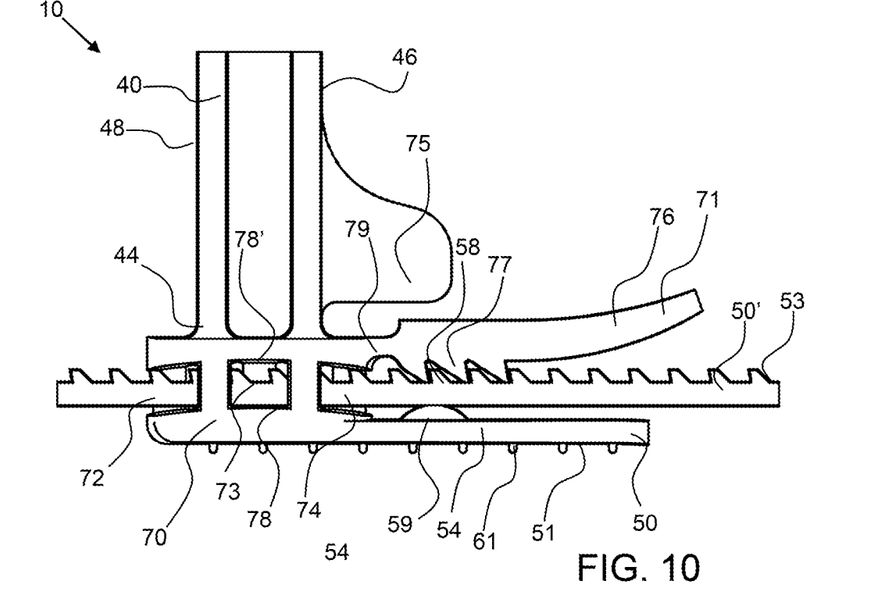
FIG. 10 shows a front view of the exemplary latch having the strap extending through the latch channel and the latch teeth on the latch-release engaged with the strap teeth to retain the strap in the latch.
Figure 11:
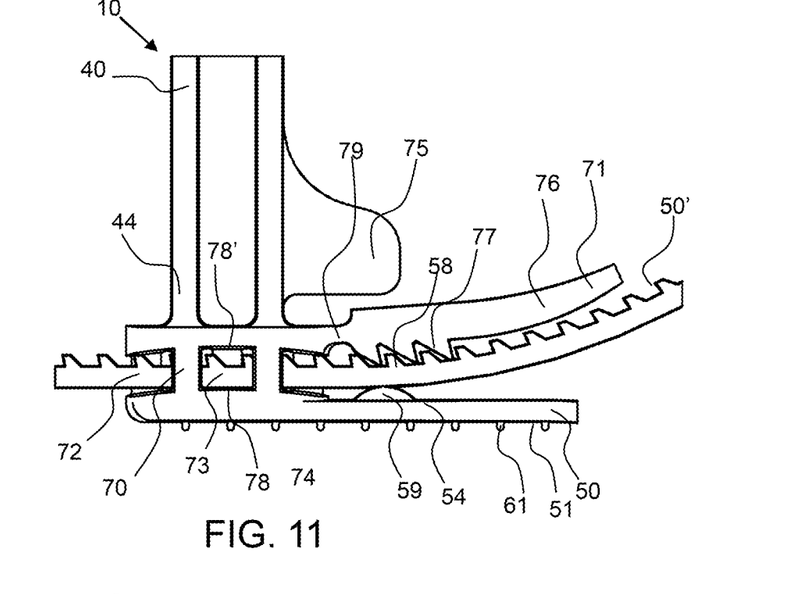
FIG. 11 shows a front view of the exemplary latch having the strap extending through the latch channel and the latch teeth on the latch-release engaged with the strap teeth to retain the strap in the latch.
Figure 12:
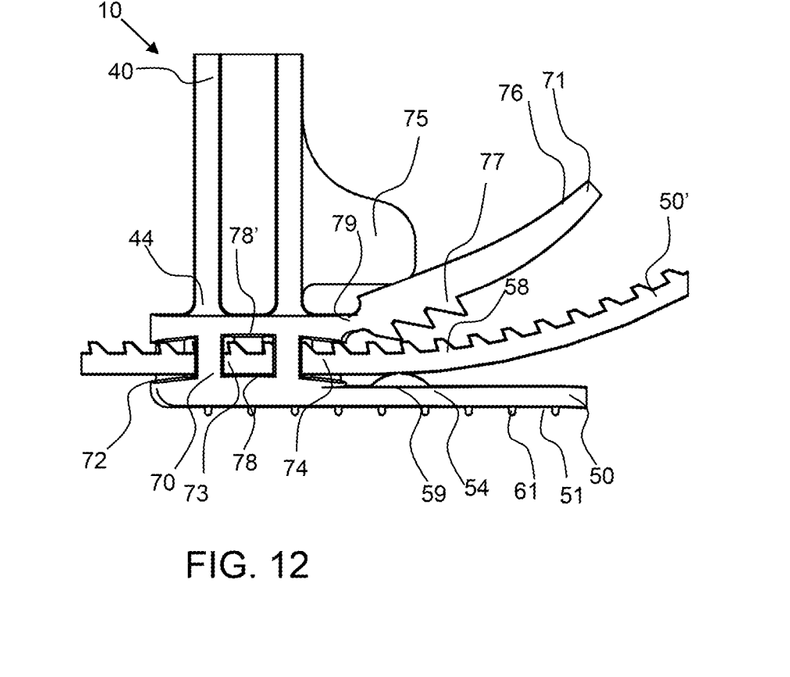
FIG. 12 shows a front view of the exemplary latch having the latch-release extended up to release the latch teeth from the strap teeth to enable the strap to be pulled back through the latch channel.

Referring now to FIGS. 6 to 14, an exemplary latch 70 is configured to releasably engage with the strap 50 to retain the strap in a secure position around a lobster, shellfish or portion of a shellfish. The latch is configured on the latch end 44 of the handle extension 40. The latch has a latch channel 73 extending from the latch inlet 72 to the latch outlet 74. The latch may have strap guide surfaces 78, 78' along the bottom and top of the latch channel 73, respectively, that is a contoured surface configured to guide the strap 50 to extend out from the latch outlet in a preferred direction, as best shown in FIG. 8. A strap guide surface may be configured in the bottom and/or top of the latch channel 73. As shown, the strap guide surfaces on the top and bottom of the latch channel forms a latch channel that has curvature, or a radius of curvature that directs the strap straight from the latch outlet to ensure better engagement with the latch teeth. This radius of curvature creates three points of contact between the strap and the latch channel, with two being on the top corners of the latch channel and one being at the apex of the strap guide surface on the bottom of the latch channel. The curvature of the latch channel may also better enable the strap to slide through the channel more easily. The curve or radius of the latch channel is in the same orientation as the curvature of the strap loop formed around a lobster. As best shown in FIGS. 8, 9, 10 and 11, a latch engagement protrusion 59 is configured proximal to the latch end 54 of the strap and is configured to press the strap 50 up against the latch teeth 77 or latch-release 76. The latch teeth 77 engage with the strap teeth 58 to secure the strap in the latch, as shown in FIGS. 8, 10 and 11. As shown in FIG. 12 the latch-release 76 is lifted up to disengage the latch teeth 77 from the strap teeth 58. The strap 50 can then be pulled through the latch channel 73 to release the strap and lobster retained thereby. The latch-release stop 75 prevents the latch-release from pivoting to much about the latch hinge 79, which may be a living hinge. The latch hinge may be a flexible extension of the latch-release between the latch-release and the latch 70 or handle extension 40, and may have a reduced cross-sectional area than the latch-release 76.

Figure 13:
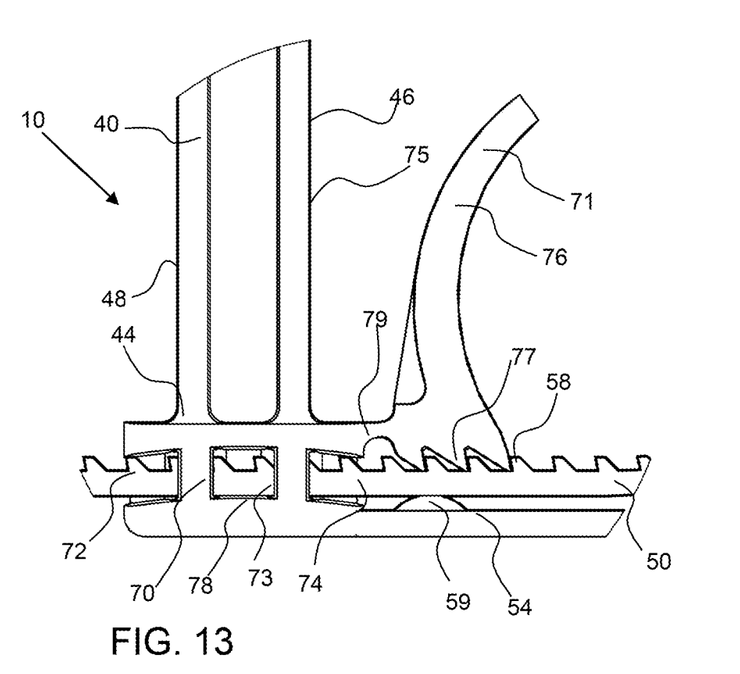
FIG. 13 shows a front view of an exemplary lobster tether having a latch-release that extends up along the handle extension.
Figure 14:
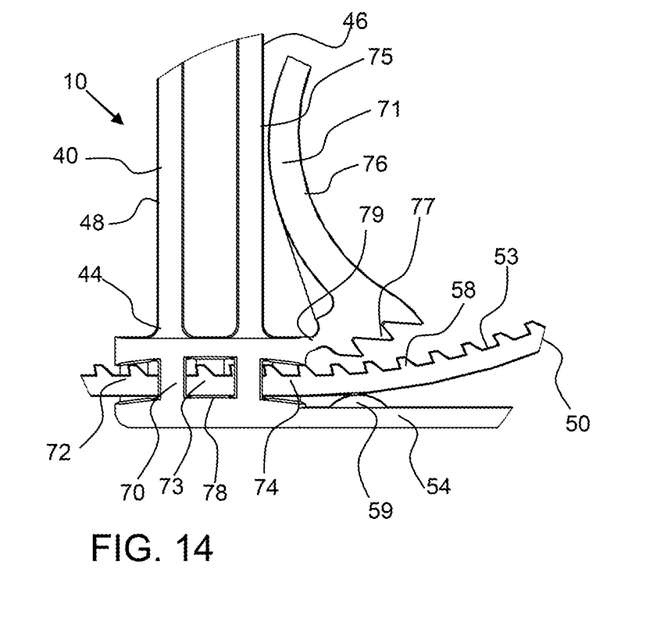
FIG. 14 shows a side view of the exemplary latch shown in FIG. 13 with the latch-release pivoted up to release the strap.

Referring now to FIGS. 13 and 14, the latch-release 76 has a different geometry than that shown in FIGS. 6 to 12. The latch-release extends upward and is configured to be squeeze toward the handle extension 40 to release the latch teeth 77 from the strap teeth 58. In this configuration, the strap side 46 of the handle extension 40 may act as a latch-release stop 75.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of retrieving a lobster from a water tank comprising:
   a) providing a lobster tether comprising:
      i) a handle extension comprising:
         a handle end;
         a latch end;
         a length of at least 100 mm from the latch end to the handle end;
         wherein the handle is free-standing;
      ii) a handle configured on the handle end of the handle extension;
      iii) a latch configured on the latch end of the handle extension and comprising:
         a latch inlet;
         a latch outlet;
         a latch channel extending from said latch inlet to said latch outlet;
         a latch hinge;
         a latch-release coupled to the latch by said latch hinge; and
         a plurality of latch teeth extending from the latch-release;
      iv) a strap extending from the latch and comprising:
         a latch end;
         an extended end;
         a length of at least 100 mm from the latch end to the extended end; and
         a plurality of strap teeth;
      wherein the extended end of the strap is configured to extend through the latch channel to configure the strap in the latch channel and to engage the strap teeth with the latch teeth to retain the strap in a fix position in the latch;
   b) extending the strap around said lobster and inserting the extended end of the strap into the latch channel through the latch inlet to configure the strap through the latch channel and engage the latch teeth with the strap teeth;
   c) pulling the extended end of the strap to secure the strap around the lobster and in the latch;
   d) placing the lobster in said water tank; and
   e) retrieving the lobster from the water tank by grabbing the handle and pulling the lobster out of the tank by the handle.

2. The method of claim 1, wherein the handle extension length is at least 200 mm.

3. The method of claim 1, wherein the handle has a grip portion that extends outward from the handle extension.

4. The method of claim 1, wherein the handle is a T-handle having a pair of grip portions that extends orthogonally in opposing directions from the handle extension.

5. The method of claim 4, wherein the T-handle has a grip portion comprising undulations on a bottom of said T-handle.

6. The method of claim 1, wherein the handle has an identification portion comprising a planar surface.

7. The method of claim 1, further providing an identification label and further comprising placing the identification label on the identification portion of the handle.

8. The method of claim 7, further comprising weighing the lobster to determine a weight of said lobster and wherein the identification label has said weight of said lobster thereon.

9. The method of claim 7, wherein the identification label comprises a weight of said lobster.

10. The method of claim 1, wherein the strap has a length of 200 mm.

11. The method of claim 1, wherein the strap has an inside surface and an outside surface and wherein the strap teeth are configured on an outside surface.

12. The method of claim 1, wherein the strap extends from a bottom of the latch from an opposing side of the latch channel from the handle extension.

13. The method of claim 1, wherein the strap has a body portion extending from the latch end that has no strap teeth.

14. The method of claim 1, wherein the strap has strap grip protrusion extending from the inside surface of the strap.

15. The method of claim 1, further comprising a latch engagement protrusion located proximal to the latch end of the strap and extending from an outside surface of the strap and configured to engage with and press the strap toward the latch-teeth when the strap is configured through the latch channel.

16. The method of claim 1, wherein the latch hinge is a living hinge.

17. The method of claim 16, further comprising a latch-release stop that extends over the latch-release to intercept the latch-release when the latch-release is pivoted to release a strap retained in the latch.

18. The method of claim 16, wherein the latch-release is configured on the strap side of the handle extension.

19. The method of claim 16, wherein the latch-release is configured to actuate toward the handle extension to release the latch teeth from the strap teeth to allow the strap to be release from the latch.

20. The method of claim 1, wherein the latch channel further comprises a strap guide surface that is a contoured surface to guide the strap through the latch channel.

21. The method of claim 1, wherein the strap guide surface is configured along a top and a bottom of the latch channel to produce a latch channel having a radius of curvature.

\* \* \* \* \*